United States Patent
Injeyan et al.

(10) Patent No.: US 6,256,142 B1
(45) Date of Patent: *Jul. 3, 2001

(54) END PUMPED ZIG-ZAG SLAB LASER GAIN MEDIUM

(75) Inventors: Hagop Injeyan, Glendale; Carolyn S. Hoefer, Malibu, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,011

(22) Filed: May 30, 2000

Related U.S. Application Data

(63) Continuation of application No. 09/111,080, filed on Jul. 7, 1998, now Pat. No. 6,094,297.

(51) Int. Cl.$^7$ .............. H01S 3/00; H01S 3/091
(52) U.S. Cl. ............................ 359/345; 372/71
(58) Field of Search .................. 354/345, 342; 372/71, 41, 66

(56) References Cited

U.S. PATENT DOCUMENTS

| | | |
|---|---|---|
| 3,679,999 | 7/1972 | Chernoch . |
| 4,127,827 | 11/1978 | Barry . |
| 4,191,931 | 3/1980 | Kuppenheimer . |
| 4,730,324 | 3/1988 | Azad . |
| 4,852,109 | 7/1989 | Kuchar . |
| 4,949,346 | 8/1990 | Kuper et al. . |
| 4,984,246 | 1/1991 | Cabaret et al. . |
| 5,119,382 | 6/1992 | Kennedy . |
| 5,271,031 | 12/1993 | Baer . |
| 5,305,345 | 4/1994 | Albrecht et al. . |
| 5,307,430 | 4/1994 | Beach et al. . |
| 5,317,585 | 5/1994 | Gregor . |
| 5,351,251 | 9/1994 | Hodgson . |
| 5,394,420 | 2/1995 | Senn et al. . |
| 5,408,480 | 4/1995 | Hemmati . |
| 5,441,803 | 8/1995 | Meissner . |
| 5,548,606 | 8/1996 | Senn et al. . |
| 5,555,254 | 9/1996 | Injeyan et al. . |
| 5,608,742 | 3/1997 | Petersen . |
| 5,646,773 | 7/1997 | Injeyan et al. . |
| 5,651,021 | 7/1997 | Richard et al. . |
| 6,094,297 | * 7/2000 | Injeyan et al. ............ 359/345 |

* cited by examiner

Primary Examiner—Mark Hellner
(74) Attorney, Agent, or Firm—Robert W. Keller

(57) ABSTRACT

An optical amplifier which includes an elongated slab of solid state lasing material, such as a rare earth doped yttrium-aluminum-garnet (YAG). In order to provide a relatively increased absorption length and thus a higher overall efficiency, the optical amplifier in accordance with the present invention incorporates end pumping in which the pumped light is coaligned with the amplified light resulting in relatively longer absorption lengths and higher overall efficiencies. The coaligned pumped sources are directed to lateral faces of the slab which include windows, formed from an insulating coating such as an anti-reflection coating, at the pump wavelength. In order to cause internal reflection of the pump beam along the lasing axis, the end faces are formed at about a 45° angle relative to the longitudinal axis which causes the pumped light to be reflected within the slab co-axially a with a amplified light. In order to confine the absorption of the pumped light to the center portion of the slab, the opposing end portions of the slab may be undoped while the center portion of the slab along the longitudinal axis is doped. Such a configuration provides relatively low residual thermal lensing with virtually no birefringence.

15 Claims, 3 Drawing Sheets

END PUMPED ZIG-ZAG SLAB LASER GAIN MEDIUM

This Application is a continuation of Ser. No. 09/111,080 filed Jul. 7, 1998, now U.S. Pat. No. 6,094,297.

CROSS-REFERENCE TO RELATED APPLICATIONS

This application is a related to the following commonly owned co-pending applications: Ser. No. 09/104,477, filed on Jun. 25, 1998, entitled, "Laser with Two Orthogonal Zig-Zag Gain Media for OPD Compensation", pending by Injeyan et al..

BACKGROUND OF THE INVENTION

1. Field of the Invention

The present invention relates to an optical amplifier for use, for example, in a high powered solid state laser and more particularly to an optical amplifier which includes an elongated slab of a solid state lasing material, for example, a rare earth doped yttrium-aluminum-garnet (YAG) crystal and a plurality of diode arrays for exciting the solid state lasing material to a relatively high energy metastable state, wherein the pumping light is coaligned with the amplified light resulting in relatively long absorption lengths and thus higher overall efficiencies, making the configuration particularly suitable for optical amplifiers which use solid state lasing materials which have a relatively low absorption length, such as Yb and Tm.

2. Description of the Prior Art

Optical amplifiers are known which include an elongated generally rectangular or square slab of a lasing material, such as a rare earth doped yttrium-aluminum-garnet (YAG) crystal. The slabs are formed with a generally rectangular or square cross section area defining a pair of opposing end faces and four lateral faces. Material for the slab is selected to have a relatively high index of refraction. The slab is cooled with a cooling medium having a relatively low index of refraction. This change in the index of refraction at the slab coolant interface results in incident light beams directed to one end face of the slab being totally internally reflected through the slab in a zig-zag manner. As such, the optical amplifiers with such a configuration have become known as zig-zag amplifiers. Examples of solid state lasers utilizing such zig-zag amplifiers are disclosed in U.S. Pat. Nos. 4,730,324; 4,852,109 and 5,305,345.

In order to excite the solid state lasing material to a relatively high energy metastable state, various pumping sources, such as diode arrays are used, for example, as disclosed in U.S. Pat. Nos.: 4,852,109; 4,949,346; 4,984,246; 5,271,031; 5,305,345; 5,317,585 and 5,351,251. In many known optical amplifiers, the pumping sources are configured such that the light from the pumping source is directed along a lateral face of the slab in a direction generally perpendicular to the longitudinal axis of the slab. Examples of optical amplifiers with such a configuration are disclosed in U.S. Pat. Nos.: 4,127,827; 4,852,109; 5,271,031; 5,305,345; 5,646,773 and 5,651,021. Commonly owned co-pending application, Ser. No. 08/766,434 filed on Dec. 12, 1996 discloses a configuration where a plurality of diode arrays are directed along the lateral faces of the slab. The system disclosed in '434 application utilizes diode arrays directed generally orthogonal to a longitudinal axis of the slab as well as diode arrays which are directed at an angle relative to the lateral faces to provide a general uniform energy distribution in the slab. Such configurations, known as side pumped configurations, unfortunately limit the absorption length of the pumping light to just a few millimeters. When such side pump configurations are used with optical amplifiers which use a solid state lasing material having a relatively low absorption coefficient, such as Yb and Tm doped materials, a relatively low absorption efficiency and, thus a lower overall efficiency results. Thus, there is a need for optical amplifiers capable of relatively longer absorption lengths resulting in relatively higher overall efficiencies.

SUMMARY OF THE INVENTION

Briefly, the present invention relates to an optical amplifier which includes an elongated slab of solid state lasing material, such as a rare earth doped yttrium-aluminum-garnet (YAG) slab. In order to provide a relatively increased absorption length and thus a higher overall efficiency, the optical amplifier in accordance with the present invention incorporates end pumping in which the pumped light is coaligned with the amplified light resulting in relatively longer absorption lengths and higher overall efficiencies. The coaligned pumped sources are directed to lateral faces of the slab which include footprints or windows, formed from anti-reflection coatings at the pump wavelength. In order to cause internal reflection of the pump beam along the lasing axis, the end faces are formed at about a 45° angle relative to the longitudinal axis which causes the pumped light to be reflected within the slab co-axially with a amplified light. In order to confine the absorption of the pumped light to the center portion of the slab, the slab may be formed from a composite material with the opposing end portions of the slab formed from an undoped host material while the center portion of the slab along the longitudinal axis is formed from a doped host material. Such a configuration provides relatively low residual thermal lensing with virtually no birefringence.

DESCRIPTION OF THE DRAWINGS

The principles of the present invention may be readily understood with reference to the following specification and attached drawing wherein.

DETAILED DESCRIPTION

Figure 1:
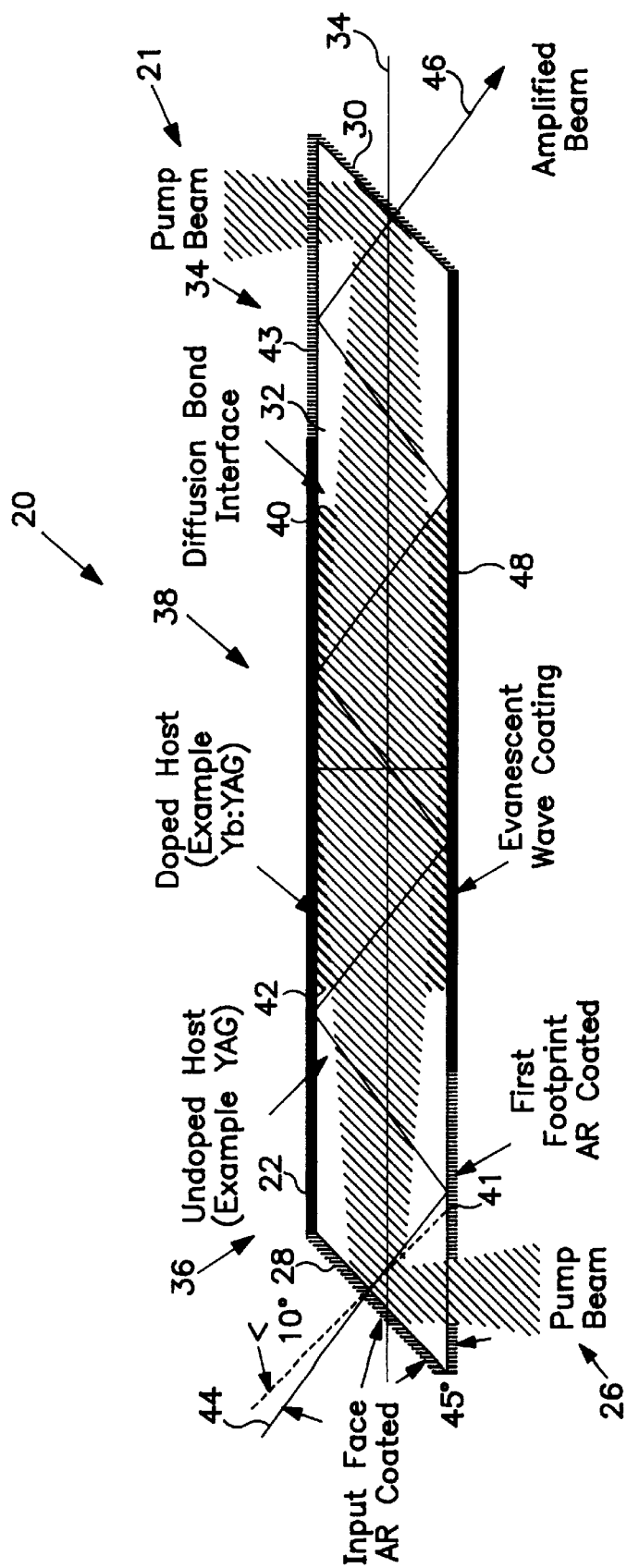
FIG. 1 is a plan view of an optical amplifier in accordance with the present invention.

The present invention relates to an optical amplifier, generally identified with the reference numeral 20. In accordance with an important aspect of the invention, the optical amplifier 20 utilizes end pumping. With such a configuration, the pumped light is coaligned with the amplified light along a longitudinal axis of the slab resulting in a relatively long absorption length, thus providing relatively higher overall efficiencies. The invention is particularly suitable for optical amplifiers which utilize solid state lasing material with relatively low absorption coefficients, such as those materials using Yb and Tm dopants. As will be discussed in more detail below, the absorption of the pumped light may be confined to a central region of the slab to reduce heating at the opposing ends of the slab which are known to be susceptible to warping.

Referring to FIG. 1, the optical amplifier 20 includes a elongated slab 22 and a pair of pumped beam sources 24 and 26. The elongated slab 22 is formed with a generally rectangular or square cross section defining a pair of opposing end faces 28 and 30 and four lateral faces 32. As used herein, a longitudinal or lasing axis 34 is defined as an axis generally parallel to the lateral surfaces 32 between the opposing end faces 28 and 30. A major axis is defined as a horizontal axis in the direction of the zig-zag pattern while a minor axis is defined to be a vertical axis generally perpendicular to the major axis. Both the major and minor axis are perpendicular to the longitudinal axis.

The slab 22 may be formed from a solid state lasing material with a relatively high index of refraction to cause internal reflection of the input beam in a generally zig-zag pattern as illustrated in FIG. 1, forming a so called zig-zag amplifier. Such zig-zag amplifiers are known to allow brightness scaling by allowing the input beam to average thermal gradients in the slab effectively providing a homogeneous gain medium. In order to reduce heating of the ends of the slab 22, the slab 22 may be formed as a diffusion bonded composite material. More particularly, along the longitudinal axis 34 of the slab 22, the opposing end portions 34 and 36 of the slab 22 can be formed from undoped host materials, such as yttrium-aluminum-garnet (YAG). These end portions 34 and 36 can be diffusion bonded to a central portion 38 of the slab 22 formed from a doped host material, such as Yb doped YAG (Yb:YAG) forming two diffusion bond interfaces 40 and 42. Such diffusion bonding techniques are known in the art, for example, as described in detail in U.S. Pat. No. 5,441,803 hereby incorporated by reference. Such a configuration limits the absorption length to the center portion 38 of the slab 22. By limiting the absorption length to the center portion 38 of the slab 22, heat generated by the optical pumping is in the center portion 38 and away from the end portions 34 and 36, which are susceptible to warping. As mentioned above, the pumped light is reflected through the slab 22. As such the pump beams 24 and 26 may enter opposing lateral faces 32 of the slab 22 at opposing end portions 34 and 36, respectively, as generally shown in FIG. 1. In order to enable the light into the slab 22, one or more footprints or windows 41 and 43 may be formed on opposing end portions 34 and 36. The windows 41 and 43 may be formed by way of a coating, such as an antireflection coating selected for the wavelength of the pump beams 24 and 26. As shown in FIG. 1, the antireflection coating is disposed on the lateral face 32 as well as the opposing end faces 28 and 30 and thereby reducing losses of the input beam and pump beam. The pump beams 24 and 26 are directed to opposing lateral faces 32 at opposing end portions 34 and 36 of the slab 32. As shown in FIG. 1, the pump beams 24 and 26 are totally reflected from the opposing end face 28 and 30 so that the pump beams are coaligned with the longitudinal axis 34. By utilizing the composite slab 22 as discussed above, the absorption length of the slab 22 is limited to the central portion 28.

An input light beam 44 is directed to one end face 28 at a relatively small angle, for example, less than 10° relative to the normal of the end face. By confining the angle of incidence of the input angle 44 and selecting a material having a relatively high index of refraction, the input light beam 44 is totally reflected along the slab 22 in a generally zig-zag pattern as shown in and is out coupled as an amplified beam 46 from the opposing end face 30. The zig-zag pattern across the slab temperature gradients combined with uniform pumping by the guided diode light and insulated slab edge results in relatively low thermal lensing with virtually no birefringence.

It is known in the art that pumping of the slab 22 results in increased temperature in the area where the pump light is absorbed. As mentioned above, pump beams, for example, from diode arrays, are directed generally perpendicular to the end faces 32 through the windows or footprints 41 and 43 and reflected from the opposing end faces 28 and 30 to cause the pump beam to be directed along the longitudinal axis 34. In order to cool the slab 22, various cooling methods can be used. Both conduction and convection cooling systems are suitable. An example of a conduction cooling system is to attach the slab 22 to a high intensity impingement cooler, for example, as manufactured by Thermal Electron in San Diego, Calif. or SDL, Inc. in San Jose Calif.

Figure 3:
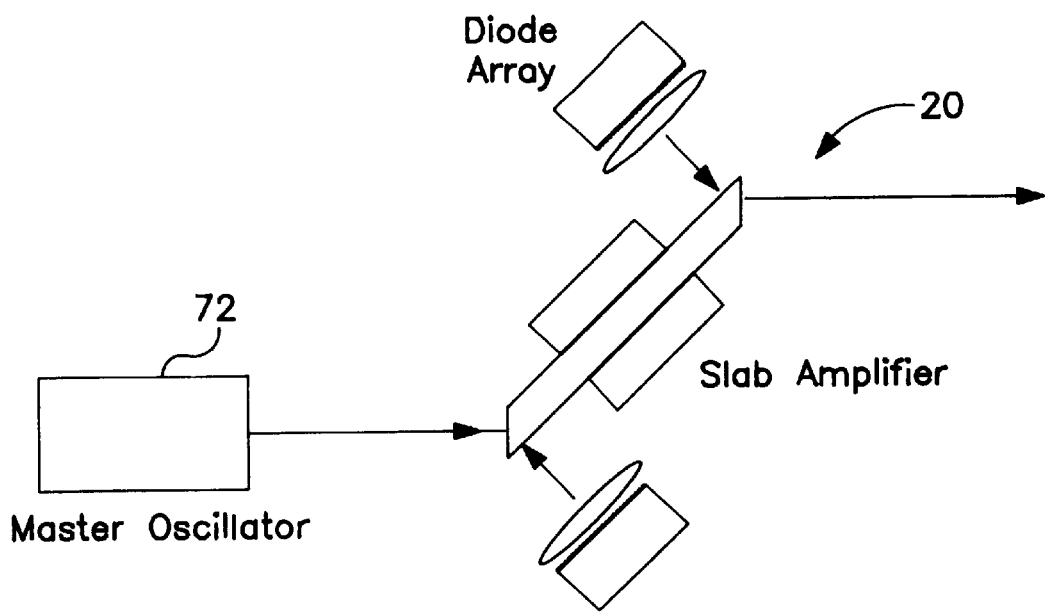
FIG. 3 is a schematic diagram of the end pumped optical amplifier in accordance with the present invention in a resonator configuration.
Figure 4:
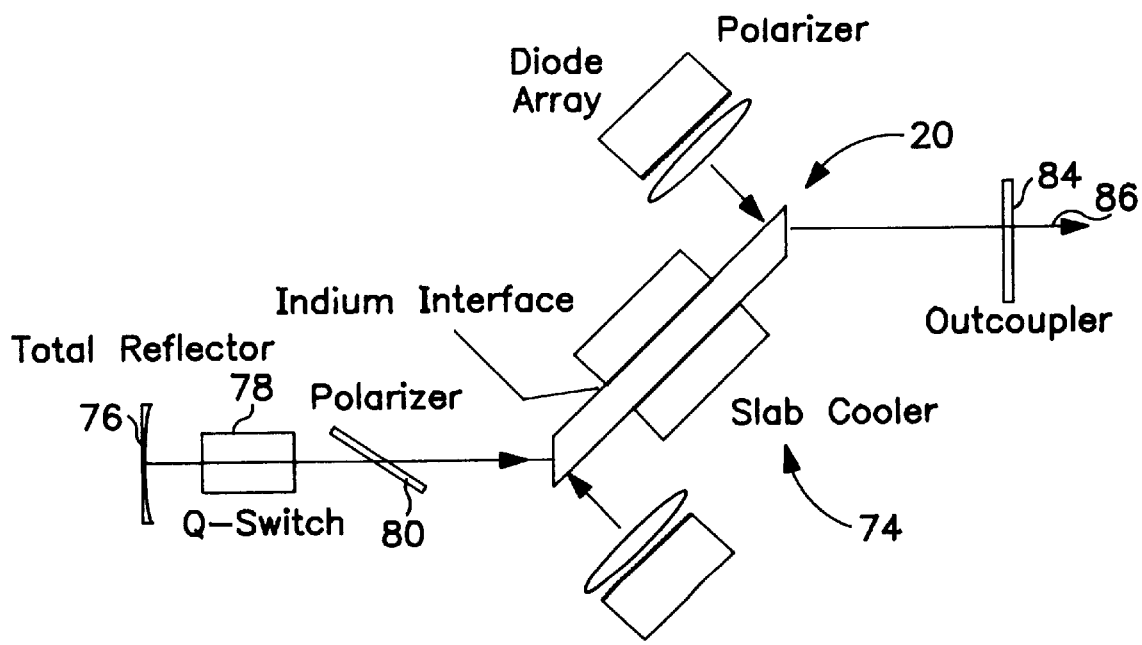
FIG. 4 is similar to FIG. 3 where the optical amplifier in accordance with the present invention is used a master oscillator power amplifier (MOPA) configuration.

To minimize the thermal resistance between the slab 22 and the coolers, a thin layer of a thermally conductive material such as a soft metal, such as indium or gold as generally illustrated in FIGS. 3 and 4, may be used. During assembly, the cooler/indium/slab assembly may be held under pressure at elevated temperatures, approximately 150° C. to flow the indium and eliminate contact resistance. For direct or convective cooling, the slab 22 may be sealed in the dead zones with a thin layer of turbulent coolant flowing over the slab faces to remove heat as discussed in detail in U.S. Pat. No. 5,646,773, hereby incorporated by reference. An exemplary convection cooling system is disclosed for example, in commonly owned U.S. Pat. No. 5,646,773, hereby incorporated by reference.

In the case of convection and conduction cooling, the lateral faces 32 of the slab 22 are coated with a dielectric material which serves as an evanescent wave coating 48 to preserve total internal reflection. As shown in FIG. 1, the evanescent wave coating 48 may extend from one end face 28, 30 to a region slightly beyond the diffusion bond interface 42, adjacent to the opposing end face. The evanescent wave coating 48 allows the slab 22 to be in directly adhered to the impingement cooler. A thick layer (2–4 $\mu$m) of $MgF_2$ or $SiO_2$ may be used as the evanescent wave coating 48.

Figure 2:
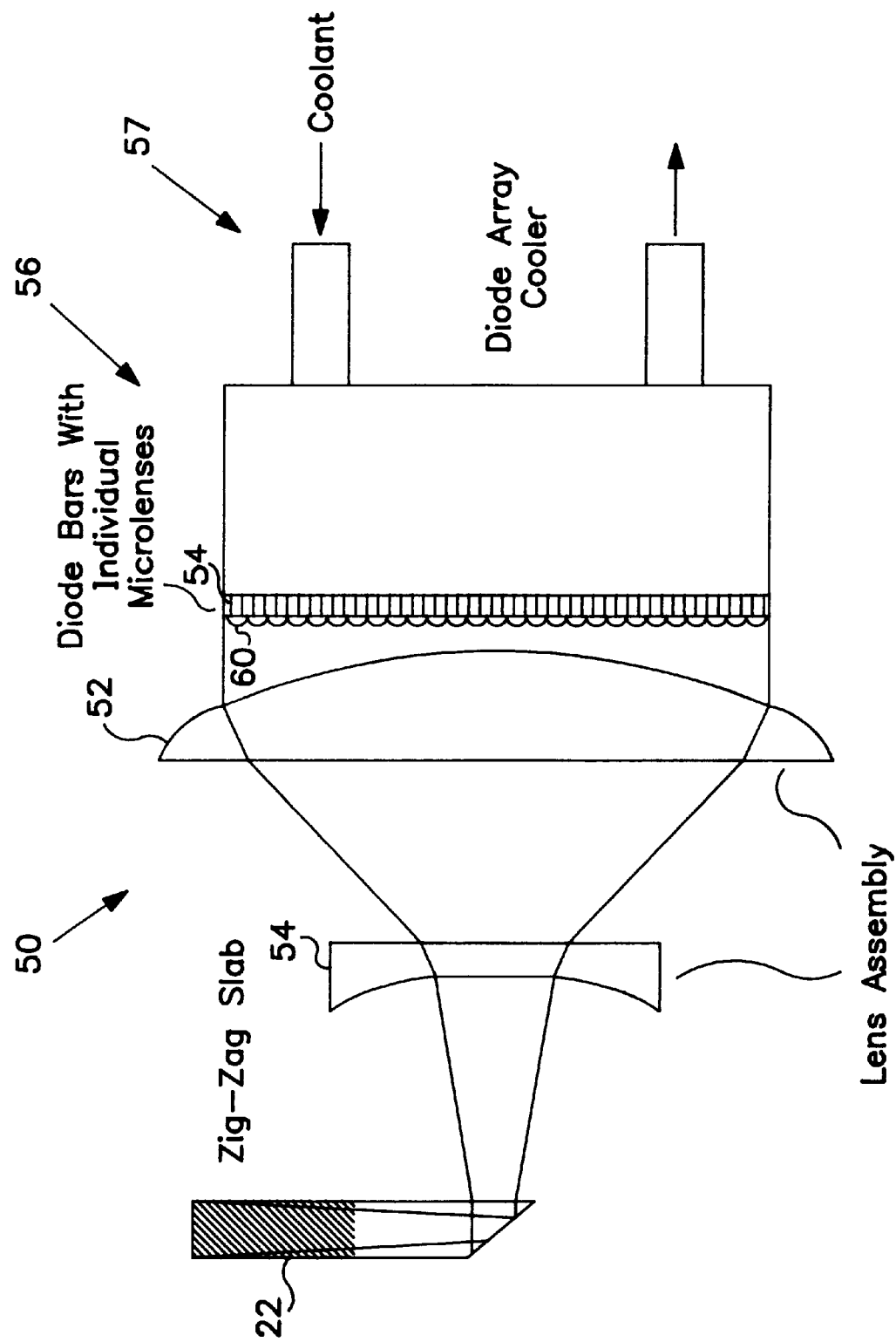
FIG. 2 is a diagram of an anamorphic lens assembly and diode array for use with the present invention.

High power diode arrays 56, for example, with a diode array cooler 57, may be used to generate the pump beams 24 and 26. Efficient pumping of the slab 22 may be achieved by using a suitable anamorphic lens assembly 50 as generally illustrated in FIG. 2. The anamorphic lens assembly includes a pair of lenses 52 and 54, disposed between a diode array 56 and the windows 41 and 43 on the slab 22. The diode arrays 56 may include a plurality of stacked diode bars 58 with individual microlenses 60. The microlenses 60 reduce the divergence of the fast axis of the bars 58 to approximately 1° while the slow axis may have a full angle divergence on the order of 7°. By using the anamorphic lens assembly 50, the output of the diode array 56 can be imaged onto the input area on the windows 41 and 43 of the slab 22 such that a 2×1 cm diode array may be imaged on an area as small as 2×2 mm.

Alternatively, a lens duct may be used in place of the anamorphic lens assembly 50. A suitable lens duct is disclosed in U.S. Pat. No. 5,307,430, hereby incorporated by reference.

The optical amplifier 20 in accordance with the present invention may be used to form a master oscillator power amplifier (MOPA). In this embodiment as illustrated in FIG.

3, a master oscillator 72 is directed to an input end face 28 of the slab 22. The master oscillator may be, for example, as discussed and illustrated with respect to FIG. 4 below. As discussed above, the input beam to the end face must be less than 10° relative to the normal axis to the end face.

As illustrated in FIG. 4, the optical amplifier 20 may be used to form a master oscillator 74. In this embodiment, an input beam is reflected from a total reflector 76 by way of a Q switch 78 and polarizer 80 to an input end face 28 of the slab 22. The output beam is directed to a outcoupler 84 which transmits an outcoupled output beam 86.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows.

We claim:

1. An optical amplifier comprising:

an elongated slab of a solid state lasing material having a predetermined cross-section defining opposing end faces and a plurality of lateral faces therebetween, a longitudinal axis defined between said opposing end forces generally parallel to said lateral faces;

means for enabling pumped light to be directed along an axis generally parallel to said longitudinal axis, said enabling means including a first footprint formed on said slab adjacent one of said opposing end faces, said one of said end faces configured at an angle relative to said longitudinal axis, said footprint enabling pump beams directed at an angle generally perpendicular to said lateral surface to be directed along said longitudinal axis; and one or more sources of pump beams.

2. The optical amplifier as recited in claim 1 wherein said enabling means includes a second footprint formed on said slab adjacent the other of said opposing end faces, said one of said end faces configured at an angle relative to said longitudinal axis, said footprint enabling pump beams directed at an angle generally perpendicular to said lateral surface to be directed along said longitudinal axis.

3. The optical amplifier as recited in claim 1, wherein said slab includes means for limiting absorption of said pumped light along said slab.

4. The optical amplifier as recited in claim 3, wherein said limiting means includes a composite slab formed from two or more materials having two or more sections, said two sections defining a non-absorbing section and an absorbing section.

5. The optical amplifier as recited in claim 4, wherein said two or more sections are diffusion bonded defining one or more diffusion bond interfaces.

6. The optical amplifier as recited in claim 5, wherein one of said non-absorbing sections is formed adjacent a first end face.

7. The optical amplifier as recited in claim 6, further including a second non-absorbing section disposed adjacent a second end face, wherein said absorbing section is disposed in between said first and second non-absorbing sections.

8. The optical amplifier as recited in claim 7, wherein said non-absorbing sections are formed from undoped solid state lasing material.

9. The optical amplifier as recited in claim 8, wherein said undoped solid state lasing material is yttrium-aluminum-garnet (YAG).

10. The optical amplifier as recited in claim 8, wherein said absorbing section is formed from a doped solid state lasing material.

11. The optical amplifier as recited in claim 10, wherein said doped solid state lasing material is $Y_b$ doped YAG.

12. The optical amplifier as recited in claim 1, wherein said one or more sources of pump beams.

13. A master oscillator power amplifier comprising:

a master oscillator; and an optical amplifier, said optical amplifier comprising;

an elongated slab of a solid state lasing material defining a longitudinal axis and opposing end faces configured at a predetermined angle relative to said longitudinal axis and a plurality of lateral faces;

means for enabling pumped light to be directed along an axis generally parallel to said longitudinal axis, said enabling means including a first footprint formed on said slab adjacent one of said opposing end faces;

said footprint enabling pump beams directed at an angle generally perpendicular to said lateral surface to be directed along said longitudinal axis; and 14. A master oscillator comprising an input light source comprising:

a total reflector;

an optical amplifier for receiving light from said input light source and generating an output beam; said optical amplifier comprising;

an elongated slab of a solid state lasing material defining a longitudinal axis and opposing end faces configured at a predetermined angle relative to said longitudinal axis and a plurality of lateral faces;

means for enabling pumped light to be directed along an axis generally parallel to said longitudinal axis, said enabling means including a first footprint formed on said slab adjacent one of said opposing end faces;

said footprint enabling pump beams directed at an angle generally perpendicular to said lateral surface to be directed along said longitudinal axis; and one or more pump sources; and an outcoupler for transmitting a portion of said output beam.

15. A master oscillator as recited in claim 14, and further comprising a Q switch and a polarizer, said total reflector, Q switch and polarizer forming said input light source.

* * * * *